Patented June 2, 1953

2,640,793

UNITED STATES PATENT OFFICE 2,640,793

COMPOSITION OF MATTER

Richard L. Doerr, Niagara Falls, N. Y., assignor to Mathieson Chemical Corporation, a corporation of Virginia No Drawing. Application February 4, 1952, Serial No. 269,905

5 Claims. (Cl. 148—26)

My invention relates to a novel composition of matter which has specific utility as a reaction flux for aluminum soldering operations. Aluminum soldering has presented great difficulties due to the fact that most metals are cathodic to aluminum so that the resulting solder bond is destroyed in the presence of moisture by electrolytic action. Also the surface of aluminum and aluminum alloys is covered by a film of aluminum oxide which is difficult to remove but which must be removed by fluxing action if a firm metal-to-metal bond is to be secured. The availability of materials that might be useful as fluxes is severely circumscribed by a number of circumstances. First, the melting point of any material or materials selected must be such that the flux melts shortly before the solder melts yet it should decompose or volatilize during the soldering operation. The flux must actively wet the metal surface and thus must possess good capillarity and flow in the liquid state. In chemical nature it must be acidic and yet have reducing capacity and it should not leave residues which are hygroscopic or electrically conducting or which cannot be removed by a post-washing operation. Preferably the decomposition products of the flux materials should be completely volatile in order to minimize or eliminate undesired residues.

The great amount of work that has been done in investigating useful aluminum soldering fluxes has produced very few if any acceptable products. German research has suggested that reaction fluxes might show promise and perhaps the best of these known to have been developed, a triple mixture of stannous chloride, zinc chloride and a hydrazine hydrohalide, with the stannous chloride employed in a large excess, upwards of about 80 per cent, appears to have been applied on a limited scale. This flux composition, however, is subject to a number of serious drawbacks. It cannot be applied except in the form of a dust and hence is not suitable for production-line soldering techniques which require application by spraying, dipping or roller brushing. Moreover, the German flux leaves hygroscopic residues which are difficult to remove by water washing.

I have found that a composition in which all zinc chloride is replaced by a hydrazine derivative, namely zinc dihydrazinium chloride $$(Zn(N_2H_4)_2Cl_2)$$

and which is composed of stannous chloride, zinc dihydrazinium chloride and either hydrazine monohydrochloride or hydrazine monohydrobromide is a powerful flux for use in soldering aluminum and yet surprisingly may be applied in the form of a viscous aqueous paste without giving rise to difficult-to-remove residues. Application of the product in aluminum soldering operations is facilitated by handling in the form of a paste prepared by the addition of up to 10 per cent water. The resulting paste may be further diluted for greater ease in handling by addition of a lower alcohol such as methyl, ethyl or isopropyl alcohol.

The proportions in which the ingredients of the composition are employed are important if acceptable results in soldering operations are to be obtained. The stannous chloride may amount to 50 to 90 per cent, the zinc dihydrazinium chloride to about 5 to 30 per cent and the hydrazine monohydrohalide to about 5 to 30 weight per cent of the composition. The hydrazine monohydrohalides of value are the monohydrochloride and the monohydrobromide, but I have found that compositions based upon the monohydrochloride appear to give best results. I have also found that a composition in which the proportions of stannous chloride, zinc dihydrazinium chloride and hydrazine monohydrochloride are, respectively, 70 per cent, 10 per cent and 20 per cent, markedly excels other combinations in most soldering applications.

The new composition functions as an active reaction flux which not only effectively removes the aluminum oxide film coating aluminum alloys but produces an actual bond with the base metal which provides a bonding surface that with solders such as lead-tin, cadmium-zinc and zinc-tin produce metal bonds of low corrosivity and of a strength usually exceeding that of the base metal. The composition is a dry powder which is non-hydroscopic and which does not give rise to troublesome residues. Although the product can be applied by dusting the metal surface to be soldered, it advantageously is employed in the form of an aqueous paste, containing up to about 10 per cent of water, which for further reduction in viscosity is thinned with a lower alcohol. The amount of alcohol employed, as well as the molecular weight of the alcohol, must not be excessive if unwanted carbonization of the flux on the metal surface during soldering is to be avoided. The product can be modified somewhat by the addition of a typical wetting agent such as Stearox–CD (a non-ionic, low-foaming polyethylene oxide type detergent) and is particularly useful in connection with the soldering of aluminum alloys to other aluminum surfaces and aluminum or its alloys to copper or brass. The invention will be further illustrated by reference to the following examples:

Example I

Stannous chloride, 165 parts, zinc dihydrazinium chloride, 14 parts, and hydrazine monohydrochloride, 20 parts, were pulverized together in a mortar and pestle and the resulting flux composition was tested for flux action on aluminum. The test was conducted by placing a small amount of the reaction flux on a small square of aluminum sheeting (0.005 inch) together with a half gram sample of 60% zinc-40% cadmium solder and then placing the aluminum plate on a hotplate at 390° to 400° C. Compared to a flux composition composed of stannous chloride, zinc chloride and hydrazine monohydrochloride in the same proportions, the zinc dihydrazinium chloride containing composition was visually observed to increase the speed of the fluxing action and the soldering operation. Also a decreased amount of residue was observed in the case of the zinc dihydrazinium chloride containing flux and the small amount of residue was readily removed by washing with hot water.

A viscous aqueous flux of the zinc dihydrazinium chloride containing flux was prepared by adding between 5 and 10% water to the dry powder and heating the mixture to boiling. On cooling the solution became more viscous but remained clear for 8 to 12 hours before slowly beginning to crystallize. The solution was reclarified by warming. By contrast, the zinc chloride containing flux with 10% water solidified too rapidly on cooling for use in this form. With higher proportions of water, reaction of the ingredients with the aluminum surface sets in at room temperature destroying the fluxing action.

Example II

A series of compositions were prepared by dry mixing stannous chloride, zinc dihydrazinium chloride and hydrazine monohydrochloride in proportions ranging from 30% to 82½% of stannous chloride, 7½% to 60% of zinc dihydrazinium chloride and 5% to 60% hydrazine monohydrochloride. The compositions were tested in the manner described in Example I. By visual observation, based largely upon solder spread area, rate of soldering, and nature and amount of residue, it was determined that a composition containing 70% stannous chloride, 10% zinc dihydrazinium chloride and 20% hydrazine monohydrochloride gave excellent results which were superior in each respect to the remaining fluxes tested. It was observed that fluxes containing substantially less than about 50% stannous chloride fail to give a desirably fluid melt. The flux compositions containing substantially above 30% zinc dihydrazinium chloride showed definitely reduced fluidity and gave rise to residues which were more difficult to remove by water washing. For example, a flux composition containing 30% stannous chloride, 60% zinc dihydrazinium chloride and 10% hydrazine monohydrochloride gave poor results, whereas a composition containing 30% stannous chloride, 10% zinc dihydrazinium chloride and 60% hydrazine monohydrochloride gave acceptable results. I have also observed that increasing the proportion of hydrazine monohydrochloride above about 30% failed to add to the effectiveness of the compositions.

I claim:

1. A flux composition for aluminum soldering which essentially comprises about 50 to 90 weight per cent stannous chloride, about 5 to 30 weight per cent of zinc dihydrazinium chloride and about 5 to 30 weight per cent of a hydrazine monohydrohalide selected from the group consisting of hydrazine monohydrochloride and hydrazine monohydrobromide.

2. A flux composition for aluminum soldering which essentially comprises about 50 to 90 weight per cent stannous chloride, about 5 to 30 weight per cent of zinc dihydrazinium chloride and about 5 to 30 weight per cent of hydrazine monohydrochloride.

3. A flux composition for aluminum soldering which essentially comprises about 70 weight per cent stannous chloride, about 10 weight per cent zinc dihydrazinium chloride and about 20 weight per cent of a hydrazine monohydrohalide selected from the group consisting of hydrazine monohydrochloride and hydrazine monohydrobromide.

4. A flux composition for aluminum soldering which essentially comprises about 70 weight per cent stannous chloride, about 10 weight per cent zinc dihydrazinium chloride and about 20 per cent of hydrazine monohydrochloride.

5. A method of bonding solder metal to aluminum surfaces which comprises applying to an aluminum surface a viscous aqueous paste of an active reaction flux which essentially comprises about 50 to 90 weight per cent stannous chloride, about 5 to 30 weight per cent of zinc dihydrazinium chloride and about 5 to 30 weight per cent of a hydrazine monohydrohalide selected from the group consisting of hydrazine monohydrochloride and hydrazine monohydrobromide, applying solid solder metal to the aluminum surface, heating the aluminum surface to melt the flux and solder metal, and thereafter permitting the surface to cool whereupon the solder metal forms a metal to metal bond with the aluminum surface.

RICHARD L. DOERR.

References Cited in the file of this patent

UNITED STATES PATENTS

| Number | Name | Date |
|---|---|---|
| 2,172,979 | Kohler et al. | Sept. 12, 1939 |

FOREIGN PATENTS

| Number | Country | Date |
|---|---|---|
| 13,182 of 1886 | Great Britain | Oct. 15, 1886 |
| 599,805 | Great Britain | Mar. 22, 1948 |
| 607,935 | Great Britain | Sept. 7, 1948 |